United States Patent
Watanabe (10) Patent No.: US 10,005,440 B2
(45) Date of Patent: Jun. 26, 2018

(54) PNEUMATIC BOOSTER

(71) Applicant: HITACHI AUTOMOTIVE SYSTEMS, LTD., Ibaraki (JP)

(72) Inventor: Shuzo Watanabe, Minami-Alps (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 414 days.

(21) Appl. No.: 14/554,474

(22) Filed: Nov. 26, 2014

(65) Prior Publication Data

US 2015/0152897 A1    Jun. 4, 2015

(30) Foreign Application Priority Data

Nov. 29, 2013  (JP) .................................. 2013-248179

(51) Int. Cl.
  *B60T 13/575*  (2006.01)
  *B60T 10/00*   (2006.01)
  *B60T 13/57*   (2006.01)

(52) U.S. Cl.
  CPC .............. *B60T 10/00* (2013.01); *B60T 13/57* (2013.01); *B60T 13/575* (2013.01)

(58) Field of Classification Search
  CPC ............................ B60T 13/573; B60T 13/575
  See application file for complete search history.

(56) References Cited

U.S. PATENT DOCUMENTS

| | | | | |
|---|---|---|---|---|
| 5,337,650 A | * | 8/1994 | Uyama | B60T 13/575 91/376 R |
| 6,119,577 A | * | 9/2000 | Takasaki | B60T 8/3275 303/113.3 |
| 8,215,226 B2 | * | 7/2012 | Watanabe | B60T 13/575 91/369.2 |

FOREIGN PATENT DOCUMENTS

JP    2006-273214    10/2006

* cited by examiner

*Primary Examiner* — F. Daniel Lopez
(74) *Attorney, Agent, or Firm* — Wenderoth, Lind & Ponack, L.L.P.

(57) ABSTRACT

A pneumatic booster capable of suppressing braking force from becoming excessive relative to an input force applied to a brake pedal. A valve mechanism (13) includes a poppet valve (14) movably attached to a small-diameter cylindrical portion of a valve body (6), an annular abutment portion formed on a plunger body of a plunger (20) to bring a variable-pressure chamber B into and out of communication with the atmosphere by unseating from and seating on the poppet valve, respectively, a movable seat member (29) movably guided by the valve body to bring a negative-pressure chamber A and the variable-pressure chamber B into and out of communication with each other, and a transmitting member (31) having one end abutting against the movable seat member and the other end disposed to surround a stepped piston of the plunger so as to be abuttable against a reaction disk (27).

7 Claims, 5 Drawing Sheets

PNEUMATIC BOOSTER

BACKGROUND OF THE INVENTION

The present invention relates to a pneumatic booster usable as a vacuum booster in a brake system of a vehicle, for example.

A brake system of a vehicle generally has a pneumatic booster provided between a brake pedal and a master cylinder. An example of this type of a pneumatic booster is capable of increasing the stroke of a master cylinder-side output rod relative to that of a brake pedal-side input rod in the initial stage of a braking operation. In this pneumatic booster, a rod having a predetermined movable range is interposed between a poppet valve of a valve device and a reaction member, and a part of reaction force from the reaction member is transmitted to the rod to open the poppet valve, thereby increasing the amount of atmospheric air to be introduced into a variable-pressure chamber (for example, see Japanese Patent Application Laid-Open Publication No. 2006-273214).

SUMMARY OF INVENTION

The pneumatic booster according to Japanese Patent Application Laid-Open Publication No, 2006-273214 is configured to increase the stroke of the output rod relative to that of the input rod by opening the poppet valve through the movement of the rod, and increasing the clearance ("jump-in" clearance) between the plunger and the reaction member. However, increasing the "jump-in" clearance undesirably increases the output force applied to the master cylinder relative to the input force applied to the brake pedal, which may result in excessive braking force.

The present invention has been made in view of the above-described problem with Japanese Patent Application Laid-Open Publication No. 2006-273214, and an object of the present invention is to provide a pneumatic booster capable of suppressing braking force from becoming excessive relative to an input force applied to a brake pedal.

To solve the above-described problem, the present invention is applied to a pneumatic booster including: a power piston dividing the interior of a housing into a constant-pressure chamber and a variable-pressure chamber; a valve body connected to the power piston and movable in the housing; a plunger disposed in the valve body and movable in response to an operation of a brake pedal; a valve device introducing atmospheric air into the variable-pressure chamber in response to movement of the plunger to produce a differential pressure between the constant-pressure chamber and the variable-pressure chamber; and an output rod transmitting thrust of the valve body to a master cylinder through a reaction member when the power piston is activated to move together with the valve body in accordance with the differential pressure. A part of reaction force acting on the output rod is transmitted to the brake pedal through the plunger having a distal end abutting against the reaction member. The introduction of atmospheric air into the variable-pressure chamber by the valve device is stopped by advance of the valve body.

The valve device includes: a poppet valve movably attached to the valve body; a first seat part formed on the plunger to bring the variable-pressure chamber and atmosphere into and out of communication with each other by unseating from and seating on the poppet valve, respectively; a second seat part movably guided by the valve body to bring the variable-pressure chamber and the constant-pressure chamber into and out of communication with each other by unseating from and seating on the poppet valve, respectively; and a transmitting member having a proximal end abutting against the second seat part and a distal end disposed adjacent to the distal end of the plunger so as to be abuttable against the reaction member. The transmitting member transmits a part of reaction force from the reaction member to the poppet valve through the second seat part to move the poppet valve, thereby unseating the first seat part and the poppet, valve from each other, and thus allowing the variable-pressure chamber to communicate with the atmosphere.

According to the present invention, it is possible to suppress braking force from becoming excessive relative to an input force applied to the brake pedal.

DESCRIPTION OF EMBODIMENTS

A pneumatic booster applied to a brake system for a vehicle will be explained below in detail with reference to the accompanying drawings as an example of a pneumatic booster according to an embodiment of the present invention.

Figure 1:
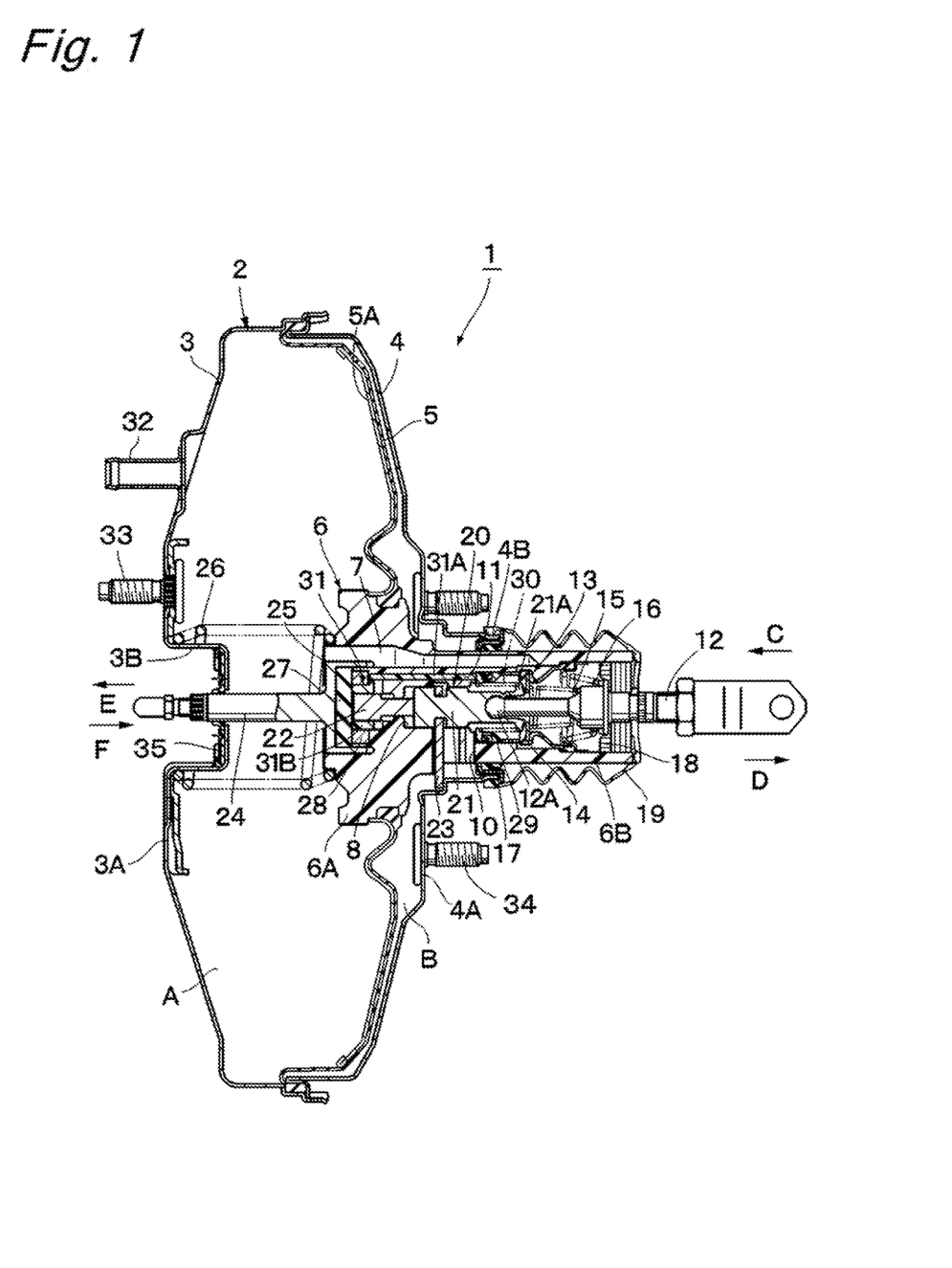
FIG. 1 is a longitudinal sectional view of a pneumatic booster according to an embodiment of the present invention.

In FIG. 1, a pneumatic booster 1 employed in this embodiment has a housing 2 constituting a shell thereof. The housing 2 of the pneumatic booster 1 comprises a front shell 3 at a side closer to the front of the vehicle and a rear shell 4 at a side closer to the rear of the vehicle. The front and rear shells 3 and 4 are gas-tightly secured to each other at the outer peripheral side thereof, and two chambers (negative-pressure chamber A and variable-pressure chamber B, which will be explained later) are defined in the housing 2 by a diaphragm 5 (explained later).

The front shell 3 of the housing 2 has a front wall 3A having an accommodating recess 3B formed, in the center thereof. The accommodating recess 3B is in the shape of a cylinder, one end of which is closed, to accommodate a part of a master cylinder (not shown). The accommodating recess 3B of the front shell 3 is provided therein with a seal member 35 (explained later) to gas-tightly seal between the outer periphery of an output rod 24 and the accommodating recess 3B by the seal member 35. The rear shell 4 has a rear wall 4A serving as a mounting surface at which the pneumatic booster 1 is secured to a vehicle (not shown). The rear shell 4 has a rear cylindrical portion 4B projecting axially outward from the center of the rear wall 4A. The rear cylindrical portion 4B has an opening end at an axial one-side end thereof.

Figure 2:
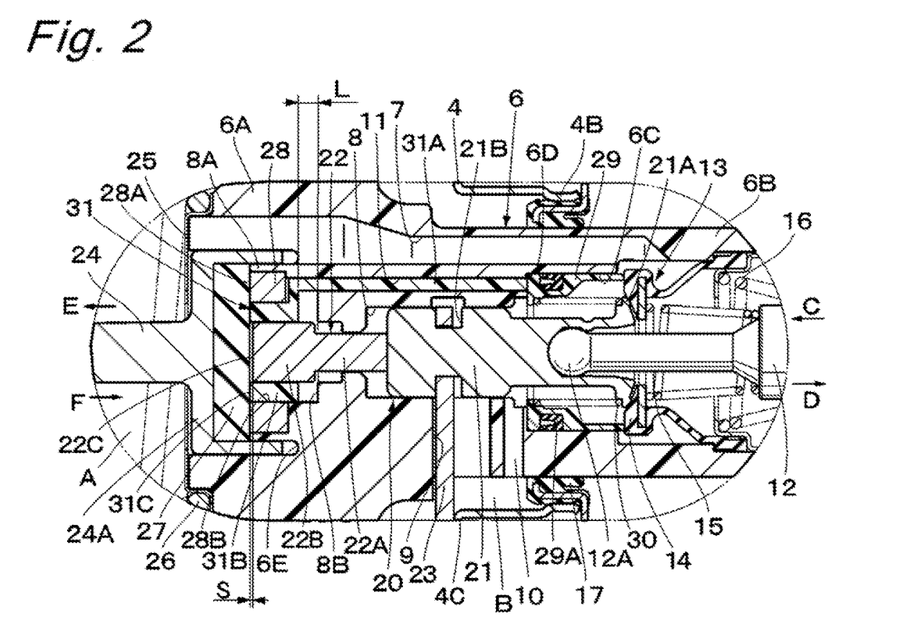
FIG. 2 is a fragmentary enlarged sectional view of a main part in FIG. 1.

In addition, the rear shell 4 has an annular shoulder portion 4C provided on a longitudinally intermediate part of the rear cylindrical portion 4B. That is, of the rear cylindrical portion 4B, a part that is located closer to the axial one side (opening end side) than the annular shoulder portion 4C is smaller in diameter than a part that is located closer to the axial other side. The shoulder portion 4C of the rear shell 4 is abutted by a stop key 23 (explained later), as shown in FIGS. 1 and 2, when a pushing action applied to an input rod 12 (explained later) is canceled. The stop key 23 limits the return position of a valve body 6 and a plunger 20.

The housing 2 is provided therein with a diaphragm 5 that is abutted by a reinforcing plate 5a. The diaphragm. 5 and the reinforcing plate 5A constitute in combination a power piston. The diaphragm 5 has an outer peripheral portion secured between the front shell 3 and the rear shell 4 and an inner peripheral portion secured to a valve body 6 (explained later) by the reinforcing plate 5A. The space formed in the housing 2 by the front shell 3 and the rear shell 4 is divided by the diaphragm 5 into a negative-pressure chamber A as a constant-pressure chamber and a variable-pressure chamber B.

The valve body 6 is formed substantially in the shape of a cylinder having an axially extending through-bore therein. The valve body 6 is formed by using a high-strength resin material, for example. The valve body 6 has a large-diameter portion 6A at the axial other side (i.e. master cylinder side) and a small-diameter cylindrical portion 6B at the axial one side (i.e. brake pedal side). The valve body 6 has the small-diameter cylindrical portion 6B inserted through the rear cylindrical portion 4B of the rear shell 4. The valve body 6 is axially displaceably, i.e. movably provided in the housing 2. The large-diameter portion 6A of the valve body 6 is connected (secured) to the inner periphery of the diaphragm 5 in the housing 2. The small-diameter cylindrical portion 6B of the valve body 6 extends from the rear cylindrical portion 4B of the rear shell 4 to the outside of the housing 2. The valve body 6 is axially displaced in the housing 2 in response to the displacement of the diaphragm 5.

In addition, the large-diameter portion 6A of the valve body 6 is formed with a communicating passage 7 that is always in communication with the negative-pressure chamber A and selectively brought into and out of communication with the variable-pressure chamber B. The communicating passage 7 extends toward the axial one side, i.e. toward the small-diameter cylindrical portion 6B. As shown in FIG. 2, the inner part of the small-diameter cylindrical portion 6B of the valve body 6 is provided with a seat sliding surface 6C formed as an axially extending circular cylindrical surface at a position radially inward of the communicating passage 7. In addition, an annular step 6D is formed as an annular stepped surface at the axial other side (inner side) of the seat sliding surface 6C in the inner part of the small-diameter cylindrical portion 6B of the valve body 6. A movable sheet member 29 (explained later) is fitted to the seat sliding surface 6C. The movable seat member 29 separably abuts against the annular step 6D of the small-diameter cylindrical portion 6B of the valve body 6.

The large-diameter portion 6A of the valve body 6 is formed with an axially extending annular fitting recess 6E at the inner peripheral side thereof. The fitting recess 6E is fitted with a flange portion 24A of an output rod 24 (explained later). The valve body 6 has a stepped bore 8 formed therein. The stepped bore 8 is a through-bore communicating with the inner peripheral side of the small-diameter cylindrical portion 6B. The stepped bore 8 extends toward the axial other side, e.g. toward the fitting recess 6E from the position of the annular step 6D in the small-diameter cylindrical portion 6B. The stepped bore 3 has a plunger 20 (explained later) slidingly movably fitted therein.

Figure 7:
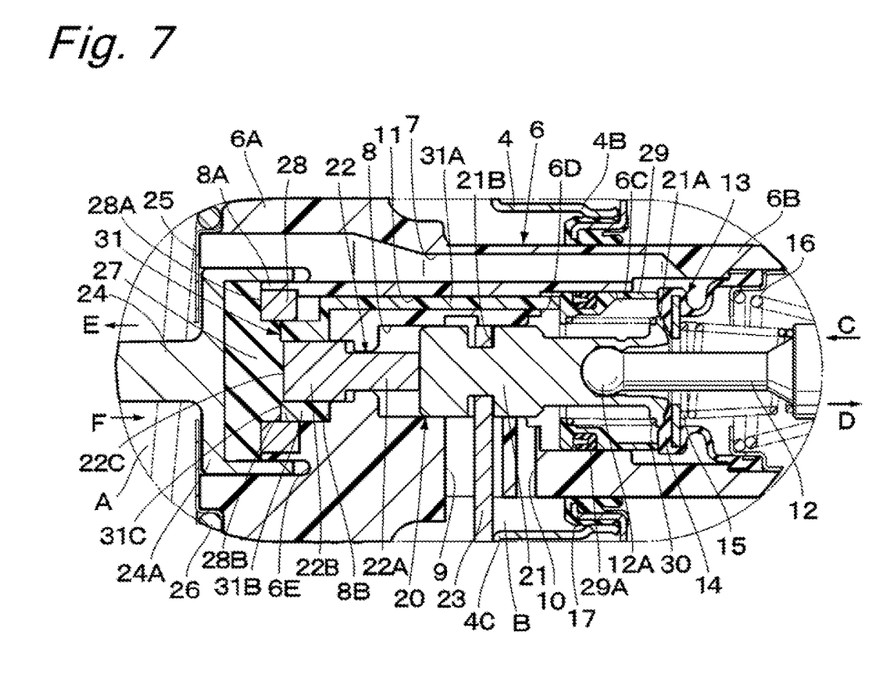
FIG. 7 is a fragmentary sectional view similar to FIG. 2, showing the way in which the pneumatic booster maintains braking force when the movement of the transmitting member is completed.

The stepped bore 8 in the valve body 6 is closed by a reaction disk 27 (explained later) at an opening end 8A thereof on the axial other side. In addition, the stepped bore 8 of the valve body 6 is formed with an annular step portion 8B that faces a cylindrical portion 31B of a transmitting member 31 (explained later). Between the step portion 8B and the cylindrical portion 31B is provided a gap of distance L (see FIG. 2) when the pneumatic booster 1 is inoperative. When, the pneumatic booster 1 is operative, the cylindrical portion 31B of the transmitting member 31 is abuttable against the step portion 8B, as shown in FIG. 7. In addition, the valve body 6 is formed with a key receiving bore 9 and another communicating passage 10, which extend in the radial direction of the stepped bore 8. The key receiving bore 9 has a stop key 23 inserted therein for use with a plunger 20 (explained later). The communicating passage 10 allows the inner part of the stepped bore 8 to communicate with the variable-pressure chamber B at all times.

The valve body 6 is provided with rod receiving bores 11 axially extending from the step portion 8B of the stepped bore 8 toward the annular step 6D in the small-diameter cylindrical portion 6B. In this embodiment, three rod receiving bores 11 are provided. The rod receiving bores 11 are circumferentially spaced from each other so as not to intersect the key receiving bore 9. The rod receiving bores 11 have rod portions 31A of a t ran strut ting member 31 (explained later) axially movably inserted therein, respectively. If should be noted that although three rod receiving bores 11 are provided in this embodiment, the number of rod receiving bores 11 may be 1, 2, or 4 or more.

The input rod 12 has an axial one-side end projecting to the outside from the rear cylindrical portion 4B of the rear shell 4 and an axial other-side end inserted into the small-diameter cylindrical portion 6B of the valve body 6. The other-side end of the input rod 12 is integrally formed, with a spherical portion 12A having a substantially spherical shape. The spherical portion 12A is connected, to a plunger 20 (i.e. plunger body 21, explained later) by caulking or other similar method. The input rod 12 is connected at the axial one-side end (projecting end) to a brake pedal (not shown) of the vehicle. The input rod 12 is pushed in the direction of the arrow C shown in FIG. 1 when the brake pedal is actuated.

Between the small-diameter cylindrical portion 6B of the valve body 6 and the input rod 12 is provided a valve mechanism 13 as a valve device for producing a differential pressure between the negative-pressure chamber A and the variable-pressure chamber B in the housing 2. The valve mechanism 13 includes a poppet valve 14, an abutment portion 21A of a plunger body 21, a movable seat member 29, and a transmitting member 31, which will be explained later. In the valve mechanism 13, the poppet valve 14 selectively unseats from and seats on the abutment portion 21A of the plunger body 21 and/or the movable seat member 29, thereby performing valve opening and closing operations (explained later) to introduce atmospheric air into the variable-pressure chamber B and to bring the variable-pressure chamber B into and out of communication with the negative-pressure chamber A.

The poppet valve 14 of the valve mechanism 13 is provided in the small-diameter cylindrical portion 6B of the valve body 6. The poppet valve 14 is formed into a substantially cylindrical shape from an elastic material. One end of the poppet valve 14 is secured being pressed against the inner peripheral wall of the small-diameter cylindrical portion 6B by a return spring 16 (explained later), etc. The other end of the poppet valve 14 is, as shown in FIG. 2, constantly urged toward the abutment portion 21A of the plunger body 21 and a movable seat member 29 (explained later) by a weak spring 15. Thus, the poppet valve 14, which constitutes a part of the valve mechanism 13, selectively unseats from and seats on the abutment portion 21A of the plunger body 21 and the movable seat member 29, as will be explained later.

The return spring 16 is disposed between the small-diameter cylindrical portion 6B of the valve body 6 and the input rod 12. The return spring 16 constantly urges the input rod 12 in the direction of the arrow D in FIG. 1 relative to the valve body 6. Consequently, when a pushing action (brake operation) applied to the input rod 12 is canceled, the input rod 12 is pushed in the arrow D direction by the return spring 16 until the valve body 6 returns to an initial position (position where input rod 12 is stopped by stop key 23, which will be explained later) in the housing 2.

The rear cylindrical portion 4B of the rear shell 4 is provided with an annular seal member 17 at the opening end thereof. The seal member 17 is in sliding contact with the outer peripheral surface of the small-diameter cylindrical portion 6B of the valve body 6 to seal between the opening end of the rear cylindrical portion 4B and the small-diameter cylindrical portion 6B. That is, the seal member 17 gas-tightly seals the variable-pressure chamber B from the outside atmosphere between the opening end of the rear cylindrical portion 4B and the small-diameter cylindrical portion 6B.

A filter 18 is fitted in the small-diameter cylindrical portion 6B of the valve body 6 to prevent dust or the like from entering the small-diameter cylindrical portion 6B, together with the working gas introduced into the small-diameter cylindrical portion 6B from the outside of the housing 2 (rear shell 4). A protective boot 19 protects the projecting end of the small-diameter cylindrical portion 6B of the valve body 6 from external dust or the like. The protective boot 19 is formed as a bellows-shaped cylinder from an elastic material. One end of the protective boot 19 is secured to an axially intermediate part of the input rod 12. The other end of the protective boot 19 is secured to the opening end (distal end) of the rear cylindrical portion 4B of the rear shell 4 to protect the outer peripheral surface of the small-diameter cylindrical portion 6B, which slides in the rear cylindrical portion 4B, from external dust or the like.

A plunger 20 is axially movably fitted in the stepped bore 8 of the valve body 6. The plunger 20 comprises a plunger body 21 and a stepped piston 22. The plunger body 21 is integrally formed with an abutment portion 21A located at an axial one side thereof. The stepped piston 22 is provided to abut against an end surface of the plunger body 21 at the axial other side (side axially opposite to abutment portion 21A). It should be noted that the plunger body 21 and the stepped piston 22 may be formed as an integral structure.

The plunger 20, which comprises the plunger body 21 and the stepped piston 22, axially moves in the stepped bore 8 of the valve body 6 relative thereto in response to an operation of the brake pedal (i.e. input rod 12).

The axial one side (one end side) of the plunger body 21 is formed in the shape of a stepped cylinder. The axial one side of the plunger body 21 projects into the small-diameter cylindrical portion 6B of the valve body 6. The plunger body 21 has the spherical portion 12A of the input rod 12 movably retained in the projecting end (one end) thereof. Thus, the plunger body 21 is displaced in the directions of the arrows C and D shown in FIG. 1, together with the input rod 12 as one unit.

As shown in FIG. 2, the projecting end (one end) of the plunger body 21 is integrally provided with an abutment portion 21A as an annular valve seat, which is formed smaller in diameter than a movable seat member 29 (explained later). The abutment portion 21A of the plunger body 21 constitutes a first seat part and selectively unseats from and seats on the poppet valve 14. Thus, the abutment portion 21A selectively enables and disables (cuts off) introduction of atmospheric air from the small-diameter cylindrical portion 6B into the communicating passage 10. That is, the abutment portion 21A of the plunger body 21 controls communication and non-communication of the variable-pressure chamber B with the atmosphere in the small-diameter cylindrical portion 6B by selectively unseating from and seating on the poppet valve 14. The abutment portion 21A of the plunger body 21 also controls communication and non-communication of the variable-pressure chamber B with the negative-pressure chamber A as the poppet valve 14 selectively unseats from and seats on the later explained movable seat member 29.

The stepped piston 22, which constitutes a part of the plunger 20, is movably disposed in the stepped bore 8 of the valve body 6, together with a transmitting member 31 (explained later). The stepped piston 22 has a small-diameter portion 22A and a large-diameter portion 22B. The small-diameter portion 22A of the stepped piston 22 abuts at an axial one-side end surface thereof against the axial other-side end surface of the plunger body 21. The large-diameter portion 22B is formed at the axial other side of the stepped piston 22. The large-diameter portion 22B has an end surface 22C, i.e. a distal end surface at the axial other side, which faces a reaction disk 27 (explained later) across a space S when the pneumatic booster 1 is in a non-braking position shown in FIG. 2. When the pneumatic booster 1 is in a braking position shown in FIGS. 4 to 7, the end surface 22C of the large-diameter portion 22B abuts against the later explained reaction disk 27.

As shown in FIGS. 4 to 7, when the plunger 20 is pushed in the axial direction in response to a braking operation, the end surface 22C of the large-diameter portion 22B of the stepped piston 22 abuts against the reaction disk 27. Consequently, brake reaction force acting on the reaction disk 27 is transmitted to the input rod 12 through the stepped piston 22 and the plunger body 21. In addition, the plunger body 21 has an annular groove 21B formed on the outer periphery thereof at a position corresponding to the key receiving bore 9. The annular groove 21B is engaged with the stop key 23.

The stop key 23 limits the return position of the plunger 20. The stop key 23 is formed by using a substantially rectangular flat plate. The stop key 23 is engaged in the annular groove 21B of the plunger body 21 in a loose-fitting manner through the key receiving bore 9 of the valve body 6. The end portion of the stop key 23 projects radially from the valve body 6 by a given distance so as to be abuttable against the shoulder portion 4C of the rear shell 4.

That is, the stop key 23 abuts against the shoulder portion 4C of the rear shell 4 when a pushing action applied to the input rod 12 is canceled, thereby limiting the return position of the valve body 6 and the plunger 20 as shown in FIGS. 1 and 2. It should be noted that the shoulder portion 4C may be replaced with a stopper member (not shown) provided on the rear shell 4 as a separate member so that the end portion of the stop key 23 abuts against the stopper member when the braking operation is canceled.

The output rod 24 is an output member that transmits boosted thrust, which is generated through the valve body 6 from the pushing force applied to the input rod 12, to the outside, i.e. toward the master cylinder, through the reaction disk 27. The output rod 24 is an output member in this embodiment. The output rod 24 has a large-diameter flange portion 24A provided at an axial one side thereof. The flange portion 24A is fitted into the fitting recess 6E of the valve body 6 in such a manner as to lid the fitting recess 6E and the stepped bore 8 through the later explained reaction disk 27 from the axial other side.

When a pushing action is applied to the input rod 12, the output rod 24 is pushed with a large output force in the direction of the arrow E shown in FIG. 1, together with the valve body 6. That is, the other end of the output rod 24 projects axially outward from the accommodating recess 3B of the front shell 3 through a seal member 35 (explained later). The other end of the output rod 24 axially pushes the piston (not shown) of the master cylinder with boosted thrust (output force) generated through the valve body 6 from the pushing force applied to the input rod 12.

A spring retainer 25 is fitted to the large-diameter portion 6A of the valve body 6 from the axial other side. The spring retainer 25 is installed so as to cover the flange portion 24A of the output rod 24 from the axial other side. The spring retainer 25 cooperates with a return spring 26 to prevent dislodging of the flange portion 24A from the fitting recess 6E of the valve body 6. The return spring 26 is disposed between the front shell 3 and the spring retainer 25 in the negative-pressure chamber A at a position radially outward of the accommodating recess 3B. The return spring 26 constantly urges the valve body 6 in the direction of the arrow F shown in FIG. 1.

A reaction disk 27 is disposed between the fitting recess 6E of the valve body 6 and the flange portion 24A of the output rod 24. The reaction disk 27 is a reaction member in this embodiment. The reaction disk 27 is formed in the shape of a disk by using an elastically deformable resin or rubber material. The reaction disk 27 transmits, to the output rod 24, thrust (thrust in arrow E direction in FIG. 1) generated in the valve body 6 by a differential pressure (pressure difference) produced between the negative-pressure chamber A and the variable-pressure chamber B, as will be explained later.

The reaction disk 27 is elastically deformed according to the thrust from the valve body 6. As the thrust from the valve body 6 increases, a part of the reaction disk 27 bulges by an amount corresponding to the size of the space S (see FIG. 2) toward the inside of a transmitting member 31 (cylindrical portion 31B, explained later) to a position where the bulging portion of the reaction disk 27 abuts against the stepped piston 22 (large-diameter portion 22B-side end surface). In this state, the reaction disk 27 receives hydraulic reaction force from the output rod 24 through the flange portion 24A. In addition, the reaction disk 27 transmits a part of the hydraulic reaction force to the input rod 12 through the plunger 20 (i.e. stepped piston 22 and plunger body 21) to give pedal response, i.e. resistance to the depression of the brake pedal, to the driver at the brake pedal.

The large-diameter portion 6A of the valve body 6 is provided with an annular pressure-receiving member 28 made of a rigid material. The pressure-receiving member 28 is fitted into the opening end 8A of the stepped bore 8 from the axial other side. The pressure-receiving member 28 constitutes a part of the valve body. The pressure-receiving member 28 is secured to the opening end 8A of the stepped bore 8 so that an abutment surface 28A thereof is constantly in abutment against the one-side surface of the reaction disk 27. The pressure-receiving member 28 is disposed to surround the large-diameter portion 22B of the stepped piston 22 from the radially outer side through the cylindrical portion 31B of the later explained transmitting member 31. More specifically, the pressure-receiving member 28 is arranged so that the transmitting member 31 is disposed in a bore 28B formed at the inner peripheral side of the abutment surface 28A. The cylindrical portion 31B of the transmitting member 31 is slidably disposed between the inner periphery of the pressure-receiving member 28 and the large-diameter portion 22B of the stepped piston 22. The plunger 20 is slidably disposed in the transmitting member 31, as will be explained later. Accordingly, both the plunger 20 and the transmitting member 31 are disposed in the bore 28B of the pressure-receiving member 28.

The movable seat member 29, together with the poppet valve 14, brings the communicating passage 7 of the valve body 6 into and out of communication with the variable-pressure chamber B. The movable seat member 29 is a second seat part in this embodiment. The movable seat member 29 is formed as a stepped cylindrical member fitted to the seat sliding surface 6C of the valve body 6. The movable seat member 29 constitutes a part of the valve mechanism 13. The movable seat member 29 is movably guided by the valve body 6. More specifically, the movable seat member 29 is axially movably guided along the seat sliding surface 6C of the valve body 6. That is, the movable seat member 29, which is in the shape of a stepped cylinder, is slidingly movably fitted to the inner part (seat sliding surface 6C) of the small-diameter cylindrical portion 6B of the valve body 6. The movable seat member 29 is urged by a spring 30 in a direction in which the movable seat member 29 is abuttable against the annular step 6D of the valve body 6. The movable seat member 29 has a seal member 29A with a C-shaped cross-section on the outer periphery thereof. The seal member 29A abuts against the seat sliding surface 6C to seal the variable-pressure chamber B from the atmosphere.

The spring 30 is disposed in a compressed state between the abutment portion 21A of the plunger body 21 and the movable seat member 29. The spring 30 constantly urges the movable seat member 29 toward the annular step 6D of the valve body 6. The movable seat member 29 is pushed toward the axial one side (arrow F direction) by the later explained transmitting member 31 (rod portions 31A) against the spring 30. In this state, the movable seat member 29 brings the negative-pressure chamber A and the variable-pressure chamber B into and out of communication with each other as the poppet valve 14 unseats from and seats on the movable seat member 29, respectively.

Figure 3:
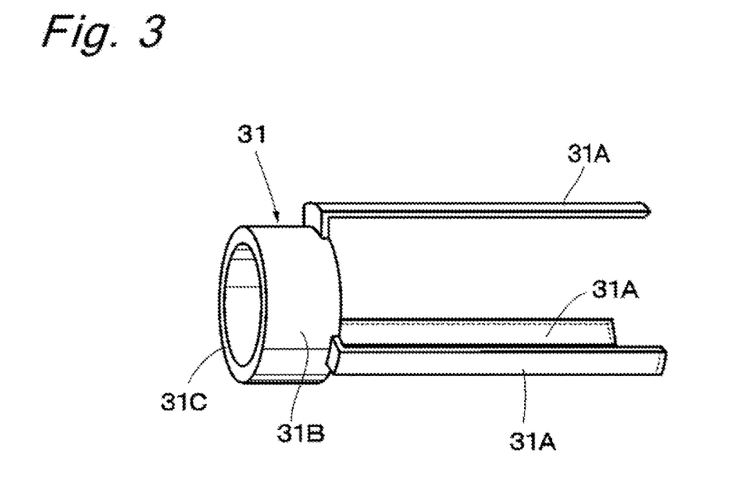
FIG. 3 is a perspective view showing a transmitting member in FIG. 2 as a single component.
Figure 4:
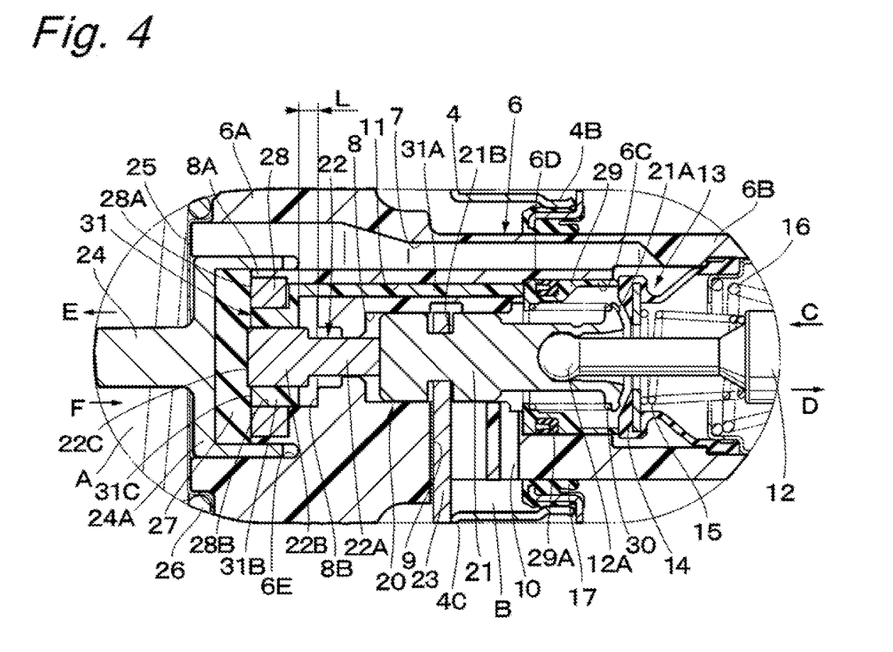
FIG. 4 is a fragmentary sectional view similar to FIG. 2, showing the pneumatic booster during "jump-in".

The transmitting member 31 is disposed in the stepped bore 8 of the valve body 6 through the rod receiving bores 11 so as to be movable in the range of distance L shown in FIG. 2. The transmitting member 31 comprises, as shown in FIG. 3, rod portions 31A and a cylindrical portion 31B. The rod portions 31A are located at an axial one side (proximal end side) thereof and movably inserted into the rod receiving bores 11, respectively, of the valve body 6. In this embodiment, three rod portions 31A are provided. The cylindrical portion 31B is formed in a cylindrical shape so as to interconnect the axial other-side ends (distal ends) of the rod portions 31A. In this embodiment, the transmitting member 31 has the rod portions 31A and the cylindrical portion 31B integrally formed from a resin material.

In other words, the transmitting member 31 comprises a plurality (e.g. three) of rod portions 31A located radially outward of the plunger 20 and axially extending through the respective rod receiving bores 11 of the valve body 6 to a position where the rod portions 31A abut against the movable seat member 29, and a cylindrical portion 31B formed as a cylindrical body having an axial other-side annular end surface 31C abuttable against the one-side surface of the reaction disk 27 in a surface-contact manner at a position adjacent to the distal end of the plunger 20, the cylindrical portion 31B being connected to the rod portions 31A at a position axially opposite to the movable seat member 29.

The rod portions 31A of the transmitting member 31 are each formed such that an axial other-side part thereof that is connected to the cylindrical portion 31B is bent in an L shape. The distal end (radially inner end) of each rod portion 31A is radially connected to the cylindrical portion 31B. When the pneumatic booster 1 is in a non-braking position shown in FIGS. 1 and 2 upon cancellation of the operation of the brake pedal, an axial gap of distance L is formed between the step portion 8B of the valve body 6 (stepped bore 8) and the cylindrical portion 31B of the transmitting member 31. The distance L defines the movable range of the transmitting member 31 within the valve body 6.

Figure 5:
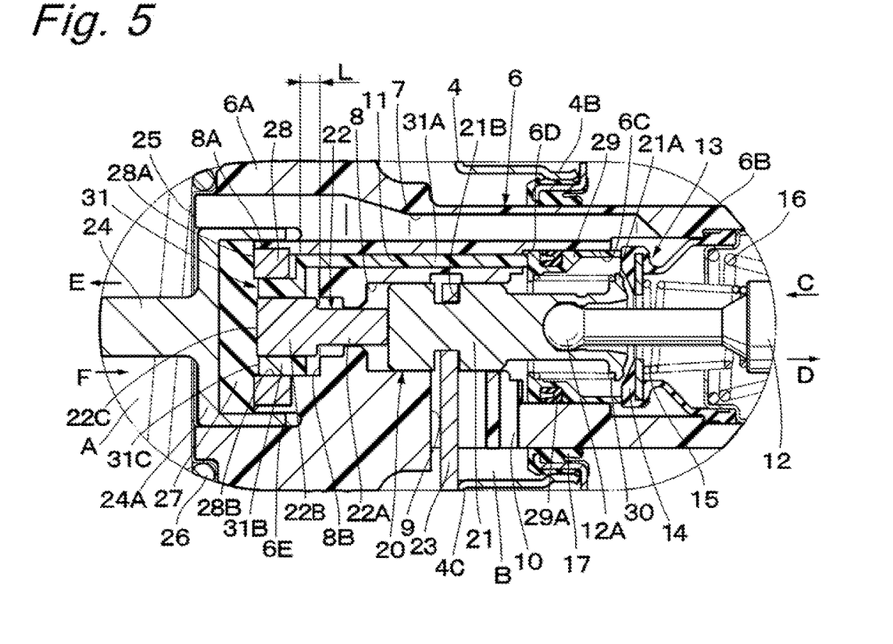
FIG. 5 is a fragmentary sectional view similar to FIG. 2, showing the pneumatic booster when hydraulic reaction force is generated.

The transmitting member 31 transmits a part of reaction force from the reaction disk 27 to the poppet valve 14 from the rod portions 31A through the movable seat member 29. The transmitting member 31 causes the poppet valve 14 to be axially moved (elastically deformed) against the weak spring 15. Consequently, the first seat part (abutment portion 21A) of the plunger 20 and the poppet valve 14 are, as shown in FIG. 5, separated and thus unseated from each other, thus allowing the variable-pressure chamber B to communicate with the atmosphere in the small-diameter cylindrical portion 6B.

The axial one-side part of each rod portion 31A of the transmitting member 31 has an arcuate plate-shaped cross-section. The rod portions 31A axially extend through the respective rod receiving bores 11 of the valve body 6 to the position of the annular step 6D. The axial one-side end of each rod portion 31A, i.e. the proximal end side thereof, abuts against the other-side end surface of the movable seat member 29. The cylindrical portion 31B of the transmitting member 31 is arranged to surround the large-diameter portion 22B of the stepped piston 22 (i.e. distal end side of plunger 20) from the radially outer side. The cylindrical portion 31B has an abutment surface 31C abuttable against the reaction disk 27.

The cylindrical portion 31B of the transmitting member 31 transmits, to the rod portions 31A, a part of brake reaction force transmitted thereto from the output rod 24 through the reaction disk 27. In addition, the cylindrical portion 31B causes the rod portions 31A to be displaced axially (arrow F direction) in the respective rod receiving bores 11. At this time, the rod portions 31A of the transmitting member 31 project toward the axial one side from the annular step 6D of the valve body 6, causing the movable seat member 29 to be axially retracted (displaced) against the spring 30. Consequently, as shown in FIG. 5, the poppet valve 14 moves in a direction away from the abutment portion 21A of the plunger body 21, thereby allowing the atmospheric air in the small-diameter cylindrical portion 6B to be introduced into the variable-pressure chamber B through the communicating passage 10.

Figure 6:
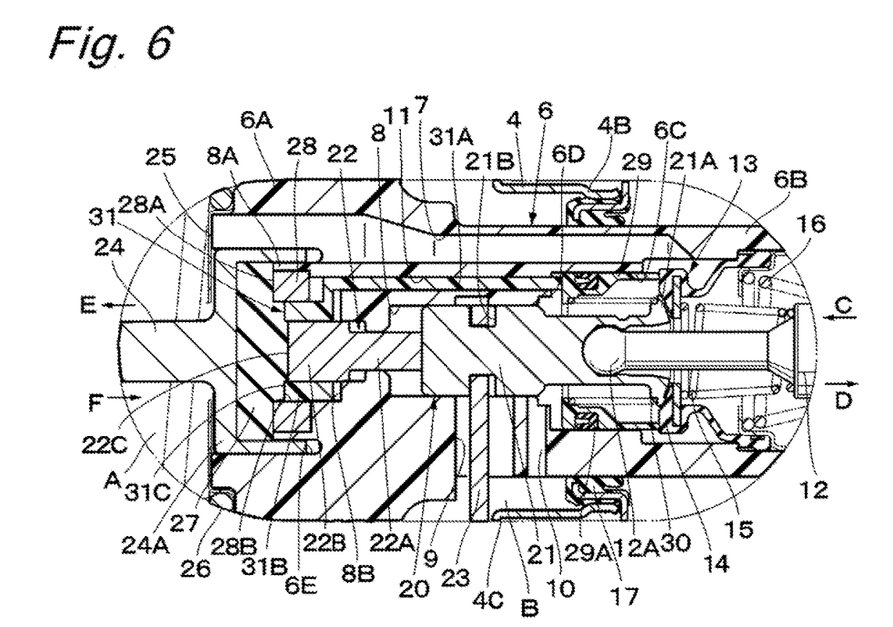
FIG. 6 is a fragmentary sectional view similar to FIG. 2, showing the way in which the pneumatic booster maintains braking force when the transmitting member is in the middle of moving.

When the communicating passage 10 of the valve body 6 communicates with the atmosphere and thus the atmospheric air is introduced into the variable-pressure chamber B, as stated above, a differential pressure is produced between the negative-pressure chamber A and the variable-pressure chamber B, causing thrust to act on the reinforcing plate 5A in the arrow E direction toward the negative-pressure chamber A. Thus, the valve body 6 advances, as shown in FIG. 6, to a position where the poppet valve 14 seats on the abutment portion 21A of the plunger body 21. As a result, the stroke of the output rod 24 becomes larger than that of the input rod 12; therefore, it is possible to reduce the loss stroke of the brake apparatus and to reduce the stroke of the brake pedal.

As shown in FIG. 7, when the transmitting member 31 retracts by a distance corresponding to the gap of distance L (see FIG. 2) and consequently the cylindrical portion 31B abuts against the step portion 8B of the stepped bore 8, the retracting displacement of the movable seat member 29 caused by the rod portions 31A is stopped. Accordingly, the increase of the stroke of the output rod 24 relative to that of the input rod 12 is also stopped. At this time, the valve body 6 has advanced until the poppet valve 14 seats on the abutment portion 21A of the plunger body 21.

A negative-pressure introduction pipe 32 is provided on the front wall 3A of the front shell 3. The negative-pressure introduction pipe 32 is, as shown in FIG. 1, formed from a pipe or the like that projects from the front wall 3A of the front shell 3. The negative-pressure introduction pipe 32 is connected to an intake manifold of an engine or a vacuum pump through a hose and a check valve (neither shown), for example. The negative-pressure introduction pipe 32 is provided to maintain the pressure in the negative-pressure chamber A lower than the atmospheric pressure by introducing a negative pressure generated when the engine or the vacuum pump is operated.

The front wall 3A of the front shell 3 is provided with a plurality of fixing bolts 33 (only one fixing bolt shown in FIG. 1) for securing the master cylinder to the front shell 3. The rear wall 4A of the rear shell 4 is provided with a plurality of mounting bolts 34 (two mounting bolts shown in FIG. 1) for securing the entire housing 2, including the rear shell 4, to the engine room inner wall or the like of the vehicle. In addition, the outer periphery of the seal member 35 is secured in a locked manner to the accommodating recess 3B of the front shell 3. The inner periphery of the seal member 35 is in sliding contact with the outer peripheral surface of the output rod 24 to gas-tightly seal the negative-pressure chamber A in the housing 2 from the outside atmosphere.

The following is an explanation of the operation of the pneumatic booster 1 according to this embodiment arranged as stated above.

First, when the vehicle driver depresses the brake pedal, the input rod 12 is pushed in the arrow C direction. Consequently, the plunger body 21 and the stepped piston 22, which constitute the plunger 20, are displaced, together with the input rod 12 as one unit, through the space S (shown in FIG. 2) in the stepped bore 8 of the valve body 6. The displacement of the plunger 20 (plunger body 21) causes the annular abutment portion 21A to unseat from the poppet valve 14 (see FIG. 4), which is restrained from following the displacement of the plunger 20 by abutment against the movable seat member 29. Consequently, the atmospheric air is introduced into the variable-pressure chamber B from the small-diameter cylindrical portion 6B of the valve body 6 through the communicating passage 10. The introduction of the atmospheric air into the variable-pressure chamber B causes a pressure difference to be produced between the negative-pressure chamber A and the variable-pressure chamber B.

The differential pressure between the negative-pressure chamber A and the variable-pressure chamber B causes the valve body 6 to be advanced in the arrow E direction by thrust generated in the reinforcing plate 5A. The thrust is transmitted to the output rod 24 through the reaction disk 27 to generate a hydraulic pressure in the master cylinder. On the other hand, hydraulic reaction force from the master cylinder is transmitted from the output rod 24 to the reaction disk 27. The reaction force causes the reaction disk 27 to be elastically deformed as shown in FIG. 5. The elastic deformation of the reaction disk 27 allows the hydraulic reaction force to be transmitted as an output reaction force to the plunger 20 through the reaction disk 27. At this time, until the output reaction force is transmitted to the plunger 20, the pneumatic booster 1 is in a so-called "jump-in" state, in which the output force of the output rod 24 increases while the input force applied to the input rod 12 is constant. Eventually, the pneumatic booster 1 reaches a so-called balanced state as shown in FIG. 6, in which the abutment portion 21A of the plunger body 21 seats on the poppet valve 14. At this time, the relationship between the stroke of the input rod 12 associated with the depression of the brake pedal and the brake hydraulic pressure generated in the master cylinder is as shown by the characteristic curve 36, which is shown by the solid line in FIG. 8.

That is, in such a brake operation state, the valve body 6 is displaced in the arrow E direction, together with the reinforcing plate 5A, in accordance with the differential pressure between the negative-pressure chamber A and the variable-pressure chamber B. In addition, the poppet valve 14 is displaced in the same direction, together with the valve body 6, in the state of being seated on the movable seat member 29. During the displacement of the valve body 6 and the poppet valve 14, the abutment portion 21A of the plunger body 21 repeats seating on and unseating from the poppet valve 14. The abutment portion 21A of the plunger body 21 is seated on the poppet valve 14 when the input force applied to the input rod 12 in the arrow C direction and the reaction force transmitted through the reaction disk 27 in the arrow F direction remain in balance (equilibrium) with each other.

As the brake pedal continues to be depressed from the state shown in FIG. 6, the abutment portion 21A of the plunger body 21 unseats from the poppet valve 14 to allow the atmospheric air to be introduced into the variable-pressure chamber B, causing the hydraulic reaction force to increase. Consequently, the reaction disk 27 is further elastically deformed, causing the cylindrical portion 31B of the transmitting member 31 to move until it abuts against the step portion 8B of the valve body 6, as shown in FIG. 7. The booster operation explained so far takes place in the initial stage of the braking operation, in which the stroke of the output rod 24 is made larger than that of the input rod 12.

As the brake pedal depressing operation is continued with the cylindrical portion 31B abutted against the step portion 8B, the output force changes relative to the input force with a given boost ratio determined by the ratio of the sum of the area of the abutment surface 28A of the pressure-receiving member 28 and the end surface 31C of the transmitting member 31 to the area of the abutment surface 22C of the plunger 20. When the pressure in the variable-pressure chamber B becomes equal to the atmospheric pressure, the boosting action based on the pressure difference cannot be obtained even if the brake pedal (input rod 12) is depressed furthermore. In other words, the pneumatic booster 1 reaches a full-load state in which the output rod 24 can be propelled only by brake pedal depressing force transmitted to the input rod 12. After the full-load state has been reached, the output rod 24 is axially displaced/together with the input rod 12 substantially as one unit.

When the brake operation is canceled, the input rod 12 is pushed back in the arrow D direction by the return spring 16, and this causes the plunger 20 to be pulled in the same direction. Consequently, the plunger body 21 causes the poppet valve 14 to move in the arrow D direction, with the abutment portion 21A seated on the poppet valve 14 to cut off the variable-pressure chamber B from, the atmosphere. Further, at this time, the movable seat member 29 is pressed in the arrow C direction by the spring 30, so that the movable seat member 29 is forcedly unseated from the poppet valve 14.

Consequently, the negative-pressure chamber A and the variable-pressure chamber B are communicated with each other through the communicating passages 7 and 10, etc., and the negative pressure in the negative-pressure chamber A is introduced into the variable-pressure chamber B. As a result, the pressure difference between the negative-pressure chamber A and the variable-pressure chamber B becomes lower than the pressure difference before the cancellation of the brake operation. The output rod 24, together with the valve body 6, is pushed back in the arrow F direction by the return spring 26. Eventually, the projecting end of the stop key 23 abuts against the shoulder portion 4C of the rear shell 4, as shown in FIG. 1.

When the stop key 23 abuts against the shoulder portion 4C, the plunger 20 is stopped at the final return position. Thus, the stop key 23 defines the final return position of the plunger 20. The reinforcing plate 5A, the valve body 6, the input rod 12, the output rod 24, etc. return to their initial positions shown in FIG. 1 as a result of cancellation of the brake hydraulic pressure from the master cylinder, etc. At this time, the poppet valve 14 seats on both the movable seat member 29 and the abutment portion 21A of the plunger body 21, thereby preparing for the next brake operation while maintaining the variable-pressure chamber B in the same negative-pressure state as in the negative-pressure chamber A.

The following is an explanation of an operation for reducing the pedal stroke by the valve mechanism 13 (poppet valve 14, abutment portion 21A of plunger body 21, movable seat member 29, and transmitting member 31) employed in this embodiment, i.e. an operation for increasing the stroke of the output rod 24 relative to that of the input rod 12 and suppressing the braking force of the brake apparatus from becoming excessively large.

The reaction disk 27 is elastically deflected and deformed by reaction force from the master cylinder which is caused by an increase in the amount of actuation of the input rod 12. At this time, as shown in FIG. 5, the reaction disk 27 presses the cylindrical portion 31B of the transmitting member 31 in the arrow F direction in the stepped bore 8 and also presses the rod portions 31A to retract axially in the respective rod receiving bores 11.

Thus, the rod portions 31A of the transmitting member 31 project toward the axial one side from the annular step 6D of the valve body 6, causing the movable seat member 29 to retract axially along the seat sliding surface 6C. The retraction (axial displacement) of the movable seat member 29 causes the poppet valve 14 to be deflectively deformed in the same direction. Consequently, the poppet valve 14 unseats (separates) from the abutment portion 21A of the plunger body 21, as shown in FIG. 5.

Accordingly, the interior of the small-diameter cylindrical portion 6B of the valve body 6 communicates with the communicating passage 10 through a gap between the poppet valve 14 and the abutment portion 21A, thereby allowing the atmospheric air to be introduced into the variable-pressure chamber B. Consequently, thrust is generated in the reinforcing plate 5A by a differential pressure between the chambers A and B, and this causes the valve body 6 to advance to a position where the poppet valve 14 seats on the abutment portion 21A of the plunger body 21. As a result, the stroke of the output rod 24 relative to that of the input rod 12 can be increased by an amount corresponding to the axial displacement of the transmitting member 31 (rod portions 31A), i.e. by an amount corresponding to a change in thickness of the reaction disk 27, and it is therefore possible to reduce the stroke of the brake pedal required to generate a desired braking force.

Figure 8:
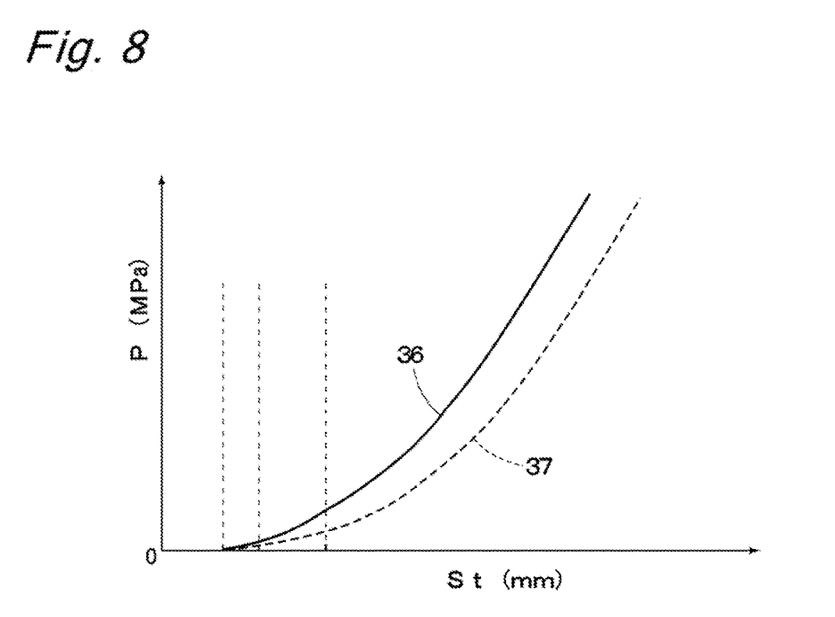
FIG. 8 is a characteristic chart showing the relationship between the input stroke and the brake hydraulic pressure in the pneumatic booster.

In contrast, the characteristic curve 37 shown by the dashed line in FIG. 8 represents the characteristics of a conventional pneumatic booster that is not equipped with the movable seat member 29 and the transmitting member 31, which constitute the valve mechanism 13. The characteristic curve 37 shows that the characteristics of the brake hydraulic pressure P to the stroke St of the input rod 12 cannot be improved as in the case of the characteristic curve 36, and that it is impossible to reduce the stroke of the brake pedal required to generate a desired braking force.

In this regard, the embodiment of the present invention employs the valve mechanism 13, which includes the poppet valve 14, the abutment portion 21A of the plunger body 21, the movable seat member 29, and the transmitting member 31, as has been stated above. Accordingly, the brake hydraulic pressure P can be increased relative to the stroke St of the input rod 12, as shown by the characteristic curve 36 of the solid line, and the stroke of the brake apparatus can be reduced.

Figure 9:
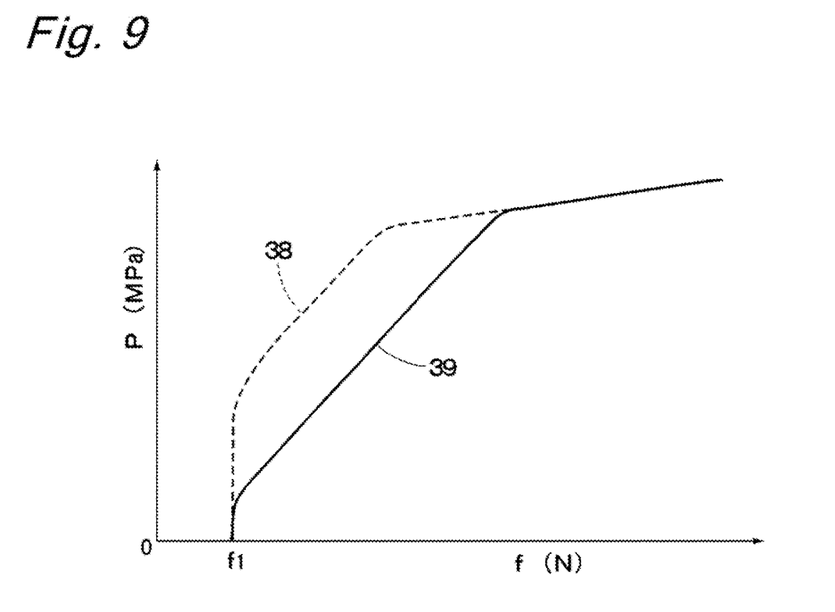
FIG. 9 is a characteristic chart showing the relationship between the input force value and the brake hydraulic pressure in the pneumatic booster.

Referring to FIG. 9, the characteristic curve 38 shown by the dashed line represents the input force f-hydraulic pressure P characteristics of a pneumatic booster in which a rod having a predetermined movable range is provided between a poppet valve of a valve device and a reaction member, as in the above-mentioned Japanese Patent Application Laid-Open Publication No. 2006-223214. In the pneumatic booster of this JP Application Publication, a part of reaction force from the reaction member is transmitted to the rod disposed in a small bore formed in a part of a reaction member abutting surface of a valve body, thereby opening the poppet valve and thus increasing the stroke of an output rod relative to that of an input rod.

In the pneumatic booster of the above-mentioned Japanese Patent Application Laid-Open Publication No. 2006-273214, as shown by the characteristic curve 38 of the dashed line, when the brake pedal depressing force f (input force value) increases to f1 to reach a "jump-in" state, the brake hydraulic pressure P tends to increase rapidly. Accordingly, braking force is likely to become excessive relative to the input force applied to the brake pedal (input rod). That is, in the pneumatic booster of the above-mentioned Japanese Patent Application Laid-Open Publication No. 2006-273214, it is necessary, in order to move the rod, to allow the reaction member to bulge into the rod bore, which is a relatively narrow small bore. Accordingly, force (output reaction force) for deforming the reaction member is needed. Therefore, it is necessary to increase the clearance between the plunger and the reaction member, i.e. "jump-in" clearance, in order to increase force (output reaction force) required for the reaction member to be deformed to bulge into the rod bore. However, increasing the "jump-in" clearance undesirably increases the output reaction force relative to the input force applied to the brake pedal (input rod), i.e. undesirably results in a steep input force f-hydraulic pressure P characteristic curve. That is, the resulting braking force may become excessively large.

Accordingly, in this embodiment, the valve mechanism 13, which is provided between the small-diameter cylindrical portion 6B of the valve body 6 and the input rod 12, is configured to comprise the poppet valve 14 movably attached to the small-diameter cylindrical portion 6B of the valve body 6, the annular abutment portion 21A formed on the plunger body 21 of the plunger 20 to bring the variable-pressure chamber B into and out of communication with the atmosphere by unseating from and seating on the poppet valve 14, respectively, the movable seat member 29 movably fitted to the seat sliding surface 6C of the valve body 6 to bring the negative-pressure chamber A and the variable-pressure chamber B into and out of communication with each other by unseating from and seating on the poppet valve 14, respectively, and the transmitting member 31 having, at the axial one side, the rod portions 31A abutting against the movable seat member 29 and, at the axial other side, the cylindrical portion 31B disposed to surround the stepped piston 22 (large-diameter portion 22B) of the plunger 20 so as to be abuttable against the reaction disk 27.

The cylindrical portion 31B of the transmitting member 31 is disposed to surround the large-diameter portion 22B of the stepped piston 22 from the radially outer side, and the end surface 31C of the cylindrical portion 31B is disposed to be abuttable against the reaction disk 27.

Therefore, the transmitting member 31 can ensure, with the cylindrical portion 31B, a circumferentially extending large area for abutment against the reaction disk 27. Accordingly, it is possible to increase the amount of axial displacement of the transmitting member 31 associated with the elastic deformation of the reaction disk 27. In addition, the movable range of the transmitting member 31 in the valve body 6 can be easily set to a predetermined distance L (see FIG. 2). Further, because the reaction disk 27 can be deformed by an amount corresponding to the area of abutment by the stepped piston 22 and the transmitting member 31, it is possible to increase the amount of deformation of the reaction disk 27 relative to the output reaction force from the master cylinder without the need to increase the "jump-in" clearance as in the pneumatic booster of the above-mentioned Japanese Patent Application Laid-Open Publication No. 2006-273214. In other words, the force (output reaction force) required for the reaction disk 27 to be deformed decreases. Accordingly, it is possible to reduce the increase of "jump-in" clearance.

Thus, the characteristics of the brake hydraulic pressure P to the brake pedal depressing force f (input force value) can be improved as shown by the characteristic curve 39 of the solid line in FIG. 9. That is, it is possible to suppress the output force value from rapidly increasing when the "jump-in" state ends at the input force value f1 and hence possible to provide proper braking force with respect to the input force applied to the brake pedal (input rod).

That is, the rod portions 31A and cylindrical portion 31B of the transmitting member 31 are retractively displaced axially in the stepped bore 8 by a distance corresponding to the gap of distance L (see FIGS. 2 and 4), and when the cylindrical portion 31B abuts against the step portion 8B of the stepped bore 8, as shown in FIG. 7, the retractive displacement of the movable seat member 29 caused through the rod portions 31A is stopped. Consequently, the increase of the stroke of the output rod 24 relative to that of the input rod 12 is canceled. It should be noted that, in the state shown in FIG. 1, the valve body 6 advances to a position where the poppet valve 14 seats on the abutment portion 21A of the plunger body 21 to keep the negative-pressure chamber A out of communication with the variable-pressure chamber B and the atmosphere.

Thus, according to this embodiment, the rod portions 31A of the transmitting member 31 are integrated together with the cylindrical portion 31B, and the cylindrical portion 31B comes into surface contact with the reaction disk 27 in a state where the cylindrical portion 31B surrounds the large-diameter portion 22B of the stepped piston 22 from the radially outer side, i.e. in a state where the distal end of the transmitting member 31 is disposed adjacent to the distal end of the plunger 20. Accordingly, portions of the reaction disk 27 that are elastically deformed have one large area; therefore, it becomes easier for the reaction disk 27 to be elastically deformed. In other words, it is possible to reduce force (output reaction force) required to deform the reaction disk 27 and hence possible to suppress braking force from becoming excessively large during a braking operation.

In addition, the cylindrical portion 31B of the transmitting member 31 is provided integrally with a plurality (e.g. a total of three) of circumferentially spaced rod portions 31A axially extending through the respective rod receiving bores 11 of the valve body 6 to the position of the annular step 6D, and the respective axial one-side ends of the rod portions 31A abut against the axial other-side end surface of the cylindrical movable seat member 29. Accordingly, the movable seat member 29 for pushing back the balanced position of the poppet valve 14 so that the poppet valve 14 is unseated from and seated on the abutment portion 21A of the plunger body 21 can be pushed to move stably and easily through a predetermined stroke (i.e. distance L, which is movable range of transmitting member 31) by the plurality of rod portions 31A.

It should be noted that, in the foregoing embodiment, the present invention, has been explained by way of an example in which a total of three rod portions 31A are provided on the transmitting member 31. However, the present invention is not limited thereto; for example, one, two, or four or more rod portions may be provided on the transmitting member 31. The transmitting member 31 may be made of a metal material. The rod portions 31A and the cylindrical portion 31B may be formed as separate parts, which are joined together to form the transmitting member 31. The cross-sectional configuration of each rod portion 31A is not limited to an arcuate plate shape but may be a polygonal or circular shape.

Although in the foregoing embodiment the end surface 31C of the cylindrical portion 31B has an annular shape, the configuration of the end surface 31C is not limited to as described above. The end surface 31C may be provided so as to surround not the entire but only a part of the outer periphery of the abutment surface 22C of the plunger 20, provided that the end surface 31C is adjacent to the abutment surface 22C.

Further, in the foregoing embodiment, the present invention has been explained by way of an example in which, when the valve body 6 returns to the initial position, the movable seat member 29 abuts against the poppet valve 14 to cut off the communication between the negative-pressure chamber A and the variable-pressure chamber B. The present invention, however, is not limited to the above. The arrangement may, for example, be such that, when the valve body 6 returns to the initial position, the poppet valve 14 separates from a second seat part (e.g. movable seat member 29) to provide communication between the negative-pressure chamber A and the variable-pressure chamber B.

According to the invention, the transmitting member has an abutment surface abuttable against the reaction disk, the abutment surface being disposed to surround an end surface of the plunger that is abuttable against the reaction disk.

Further, the transmitting member comprises at least one rod portion located radially outward of the plunger and axially extending through the valve body to a position where the rod portion abuts against the second seat part, and a cylindrical portion formed as a cylindrical body abuttable against the reaction member in a surface contact manner and connected to the at least one rod portion at a position axially opposite to the second seat part. Further, the valve body has a bore at the inner peripheral side of an abutment surface abutting against the reaction disk. In the bore are disposed the plunger and the transmitting member.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2013-248179 filed on Nov. 29, 2013. The entire disclosures of No. 2013-248179 filed on Nov. 29, 2013 including specification, claims, drawings and summary are incorporated herein by reference in its entirety.

What is claimed is:

1. A pneumatic booster comprising:
   a power piston configured to divide an interior of a housing into a constant-pressure chamber and a variable-pressure chamber;
   a valve body connected to the power piston, the valve body being movable in the housing;
   a plunger disposed in the valve body, the plunger being movable in response to an operation of a brake pedal;
   a valve device configured to introduce atmospheric air into the variable-pressure chamber in response to movement of the plunger to produce a differential pressure between the constant-pressure chamber and the variable-pressure chamber; and
   an output rod configured to transmit thrust of the valve body to a master cylinder through a reaction member when the power piston is activated to move together with the valve body in accordance with the differential pressure;
   wherein a part of reaction force acting on the output rod is transmitted to the brake pedal through the plunger having a distal end abutting against the reaction member, and wherein introduction of atmospheric air into the variable-pressure chamber by the valve device is stopped by advance of the valve body;
   the valve device comprising:
   a poppet valve movably attached to the valve body;
   a first seat part formed on the plunger to bring the variable-pressure chamber and atmosphere into and out of communication with each other by unseating from and seating on the poppet valve, respectively;

a second seat part movably guided by the valve body to bring the variable-pressure chamber and the constant-pressure chamber into and out of communication with each other by unseating from and seating on the poppet valve, respectively; and a transmitting member having a proximal end abutting against the second seat part and a distal end disposed adjacent to the distal end of the plunger so as to be abuttable against the reaction member, wherein the transmitting member transmits a part of reaction force from the reaction member to the poppet valve through the second seat part to move the poppet valve, thereby unseating the first seat part and the poppet valve from each other, and thus allowing the variable-pressure chamber to communicate with the atmosphere, wherein the transmitting member includes a cylindrical portion having an abutment surface that is abuttable against the reaction member, and a plurality of rod portions extending from the cylindrical portion, wherein the distal end of the transmitting member forms the abutment surface of the cylindrical portion, wherein the cylindrical portion is disposed so as to be adjacent to the circumference of the distal end of the plunger and surround the distal end of the plunger, the proximal end of each of the rod portions forms the proximal end abutting against the second seat part, and the distal end surface of the distal end of the plunger being abuttable against the reaction member.

2. The pneumatic booster of claim 1, wherein the valve body has a bore at an inner peripheral side of an abutment surface abutting against the reaction member, the bore having the plunger and the transmitting member disposed therein.

3. A pneumatic booster comprising:
a valve body connected to a power piston dividing an interior of a housing into a constant-pressure chamber and a variable-pressure chamber, the valve body being movable in the housing;

a plunger disposed in the valve body, the plunger being movable in response to an operation of a brake pedal;

a valve device configured to introduce atmospheric air into the variable-pressure chamber in response to movement of the plunger to produce a differential pressure between the constant-pressure chamber and the variable-pressure chamber; and an output rod configured to transmit thrust of the valve body to a master cylinder through a reaction member when the power piston is activated to move together with the valve body in accordance with the differential pressure;

wherein a part of reaction force acting on the output rod is transmitted to the brake pedal through the plunger having a distal end abutting against the reaction member, and wherein introduction of atmospheric air into the variable-pressure chamber by the valve device is stopped by advance of the valve body;

the valve device comprising:
a poppet valve movably attached to the valve body;
a movable seat member movably guided by the valve body to selectively unseat from and seat on the poppet valve; and a transmitting member having a proximal end abutting against the movable seat member and a distal end disposed adjacent to the distal end of the plunger so as to be abuttable against the reaction member;

wherein the transmitting member controls communication and non-communication between the variable-pressure chamber and atmosphere by selectively unseating from and seating on the poppet valve according to movement of the plunger;

the transmitting member moving the poppet valve with a part of reaction force from the reaction member through the movable seat member, thereby unseating the plunger and the poppet valve from each other, and thus allowing the variable-pressure chamber to communicate with the atmosphere, and wherein the transmitting member includes a cylindrical portion having an abutment surface that is abuttable against the reaction member, and a plurality of rod portions extending from the cylindrical portion, wherein the distal end of the transmitting member forms the abutment surface of the cylindrical portion, wherein the cylindrical portion is disposed so as to be adjacent to the circumference of the distal end of the plunger and surround the distal end of the plunger, the proximal end of each of the rod portions forms the proximal end abutting against the movable seat member, and the distal end surface of the distal end of the plunger being abuttable against the reaction member.

4. The pneumatic booster of claim 3, wherein the valve body has a bore at an inner peripheral side of an abutment surface abutting against the reaction member, the bore having the plunger and the transmitting member disposed therein.

5. A pneumatic booster comprising:
a valve body movable in a housing having a constant-pressure chamber and a variable-pressure chamber defined therein, the valve body having a bore therein;

a plunger disposed in the bore of the valve body, the plunger being movable in response to an operation of a brake pedal;

a valve device configured to introduce atmospheric air into the variable-pressure chamber in response to relative movement between the valve device and the plunger to produce a differential pressure between the constant-pressure chamber and the variable-pressure chamber; and a reaction member disposed to close the bore of the valve body, the reaction member distributing hydraulic reaction force from a master cylinder between the valve body and the plunger when the valve body is moved by the differential pressure;

the valve device comprising:
a poppet valve movably attached to the valve body; and
a transmitting member having a distal end disposed to be abuttable against the reaction member and a proximal end extending toward the poppet valve so as to be capable of moving the poppet valve, the transmitting member having a distal end surface disposed so as to face the reaction member at an outer peripheral side of a distal end surface of the plunger in the bore of the valve body, wherein the distal end surface of the transmitting member is disposed so as to surround the distal end surface of the plunger, wherein the transmitting member includes a cylindrical portion having an abutment surface that is abuttable against the reaction member, and a plurality of rod portions extending from the cylindrical portion, wherein the distal end of the transmitting member forms the abutment surface of the cylindrical portion, wherein the cylindrical portion is disposed so as to be adjacent to the circumference of the distal end of the plunger and surround the distal end of the plunger, the proximal end of each of the rod portions forms the proximal end abutting against a second seat part, and the distal end surface of the distal end of the plunger being abuttable against the reaction member.

6. The pneumatic booster of claim 5, wherein the valve device further comprises:

a first seat part formed on the plunger to bring the variable-pressure chamber and the atmosphere into and out of communication with each other by unseating from and seating on the poppet valve, respectively; and the second seat part is movably guided by the valve body to bring the variable-pressure chamber and the constant-pressure chamber into and out of communication with each other by unseating from and seating on the poppet valve, respectively.

7. The pneumatic booster of claim 5, wherein the second seat part is a movable seat member movably provided in the valve body to selectively unseat from and seat on the poppet valve, and the proximal end of the transmitting member is disposed so as to abut against the movable seat member.

\* \* \* \* \*